US010104034B1

(12) United States Patent
Coullon et al.

(10) Patent No.: US 10,104,034 B1
(45) Date of Patent: Oct. 16, 2018

(54) PROVIDING INVITATIONS BASED ON CROSS-PLATFORM INFORMATION

(71) Applicant: LinkedIn Corporation, Mountain View, CA (US)

(72) Inventors: Damien Albert Louis Coullon, Mountain View, CA (US); Brad C. Ciraulo, Redwood City, CA (US); Joonhyung Lim, San Jose, CA (US); Bhavana Chowdary Challa, San Jose, CA (US); Da Huo, Mountain View, CA (US); Yang Zhou, San Jose, CA (US); Xin Fu, Santa Clara, CA (US); Barry P. Huang, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 272 days.

(21) Appl. No.: 15/085,921

(22) Filed: Mar. 30, 2016

(51) Int. Cl.
*H04L 12/58* (2006.01)
*H04W 4/14* (2009.01)
*H04L 29/08* (2006.01)

(52) U.S. Cl.
CPC ............ *H04L 51/38* (2013.01); *H04L 51/32* (2013.01); *H04L 51/36* (2013.01); *H04L 67/18* (2013.01); *H04W 4/14* (2013.01)

(58) Field of Classification Search
CPC ...... G06Q 50/01; G06Q 10/107; G06Q 10/10; G06Q 10/1095; G06Q 30/08; H04L 67/306; H04L 29/06027
USPC ................ 709/204, 206, 223, 224, 227, 228
See application file for complete search history.

(56) References Cited

U.S. PATENT DOCUMENTS

| 7,805,406 | B2* | 9/2010 | Craig | H04L 67/306 707/622 |
| 8,010,602 | B2* | 8/2011 | Shen | G06Q 10/107 709/204 |
| 8,510,383 | B2* | 8/2013 | Hurley | H04W 4/02 709/203 |
| 8,738,714 | B2* | 5/2014 | Setton | G06Q 50/01 709/206 |
| 2007/0053335 | A1* | 3/2007 | Onyon | H04L 29/06027 370/338 |
| 2007/0189503 | A1* | 8/2007 | Pearson | H04M 3/42382 379/355.04 |

(Continued)

*Primary Examiner* — Frantz Coby
(74) *Attorney, Agent, or Firm* — Park, Vaughan, Fleming & Dowler LLP

(57) ABSTRACT

In order to invite individuals to join a social network, telephone contact information of a user of the social network is extracted, with the user's permission, from a phonebook associated with a telephone application on the user's portable electronic device. Then, the extracted telephone contact information is shared across different platforms to the user's desktop computer, and telephone numbers in the extracted telephone contact information are identified. These telephone numbers are associated with other portable electronic devices, and with individuals that are not currently members of the social network. After receiving confirmation of a telephone number from the user (e.g., via the desktop computer), the location of the associated portable electronic device is determined. Based on the telephone number and the location, an invitation to join the social network is conditionally provided to the portable electronic device, via a Short Message Service (SMS) message.

20 Claims, 4 Drawing Sheets

(56) References Cited

U.S. PATENT DOCUMENTS

| | | | | |
|---|---|---|---|---|
| 2007/0238443 | A1* | 10/2007 | Richardson | H04M 1/274516 455/411 |
| 2007/0276911 | A1* | 11/2007 | Bhumkar | G06Q 10/107 709/206 |
| 2008/0133580 | A1* | 6/2008 | Wanless | H04L 29/12122 |
| 2009/0171979 | A1* | 7/2009 | Lubarski | G06Q 10/10 |
| 2010/0049852 | A1* | 2/2010 | Whitnah | G06Q 10/10 709/226 |
| 2010/0146639 | A1* | 6/2010 | Kim | G06Q 10/10 726/28 |
| 2010/0211563 | A1* | 8/2010 | MacChietti | G06F 9/546 707/722 |
| 2010/0241719 | A1* | 9/2010 | Agundez Dominguez | G06Q 10/107 709/206 |
| 2010/0299276 | A1* | 11/2010 | Shahine | G06Q 10/10 705/319 |
| 2010/0317322 | A1* | 12/2010 | Underwood | G06Q 10/10 455/410 |
| 2011/0196695 | A1* | 8/2011 | Ye | G06Q 30/08 705/2 |
| 2012/0150955 | A1* | 6/2012 | Tseng | H04L 51/22 709/204 |
| 2012/0185291 | A1* | 7/2012 | Ramaswamy | G06Q 10/1095 705/7.19 |
| 2013/0024513 | A1* | 1/2013 | Sacks | G06Q 10/10 709/204 |
| 2013/0247092 | A1* | 9/2013 | Barton | G11B 27/3081 725/32 |

* cited by examiner

PROVIDING INVITATIONS BASED ON CROSS-PLATFORM INFORMATION

BACKGROUND

Field

The described embodiments relate to techniques for communicating invitations. More specifically, the described embodiments relate to techniques for obtaining contact information, sharing the contact information to a different platform, and using the contact information to provide the invitations.

Related Art

Social networks are an increasingly popular format for aggregating and interconnecting individuals who have similar interests. For example, a website may provide a professional social network for individuals in the workforce. These users may 'connect' with each other, thereby defining subsets of interrelated users in the social network.

One challenge with running a social network is the need to maintain engagement with the users so that the users continue to use the social network. A variety of approaches is used to maintain user engagement, including providing value-added content and encouraging existing users' friends, family and colleagues to join a social network. The latter has the added advantage of expanding the number of users of the social network, thereby increasing the viral value-added content in the social network and the interactions among the users.

However, it can be difficult for existing users to invite their friends, family and colleagues to join the social network. In particular, having a user manually enter contact information and generating invitations for all of their friends, family and colleagues is time-consuming and annoying. Consequently, existing approaches for maintaining and expanding the number of users of social networks are often inadequate.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to invite individuals to join a social network, telephone contact information of a user of the social network may be obtained from a phonebook associated with a telephone application on the user's portable electronic device, subject to the user's permission. Then, the telephone contact information is shared across different platforms to the user's desktop computer, and telephone numbers in the telephone contact information are identified. These telephone numbers are associated with other portable electronic devices, and with individuals that are not currently members of the social network. After receiving confirmation of a telephone number from the user (e.g., via the desktop computer), the location of the associated portable electronic device may be determined. Based on the telephone number and the location, an invitation to join the social network is conditionally provided to the portable electronic device, via a Short Message Service (SMS) message. For example, the invitation can be automatically provided to the telephone number if the location is in a region where automated SMS invitations are allowed.

In the discussion that follows, a user may be a person (for example, an existing user of the social network or a new user of the social network, who are sometimes referred to as 'members'). Also, or instead, a communication technique provided herein may be used by any type of organization, such as a business. A 'business' should be understood to include for-profit corporations, non-profit corporations, groups (or cohorts) of individuals, sole proprietorships, government agencies, partnerships, etc.

Figure 1:
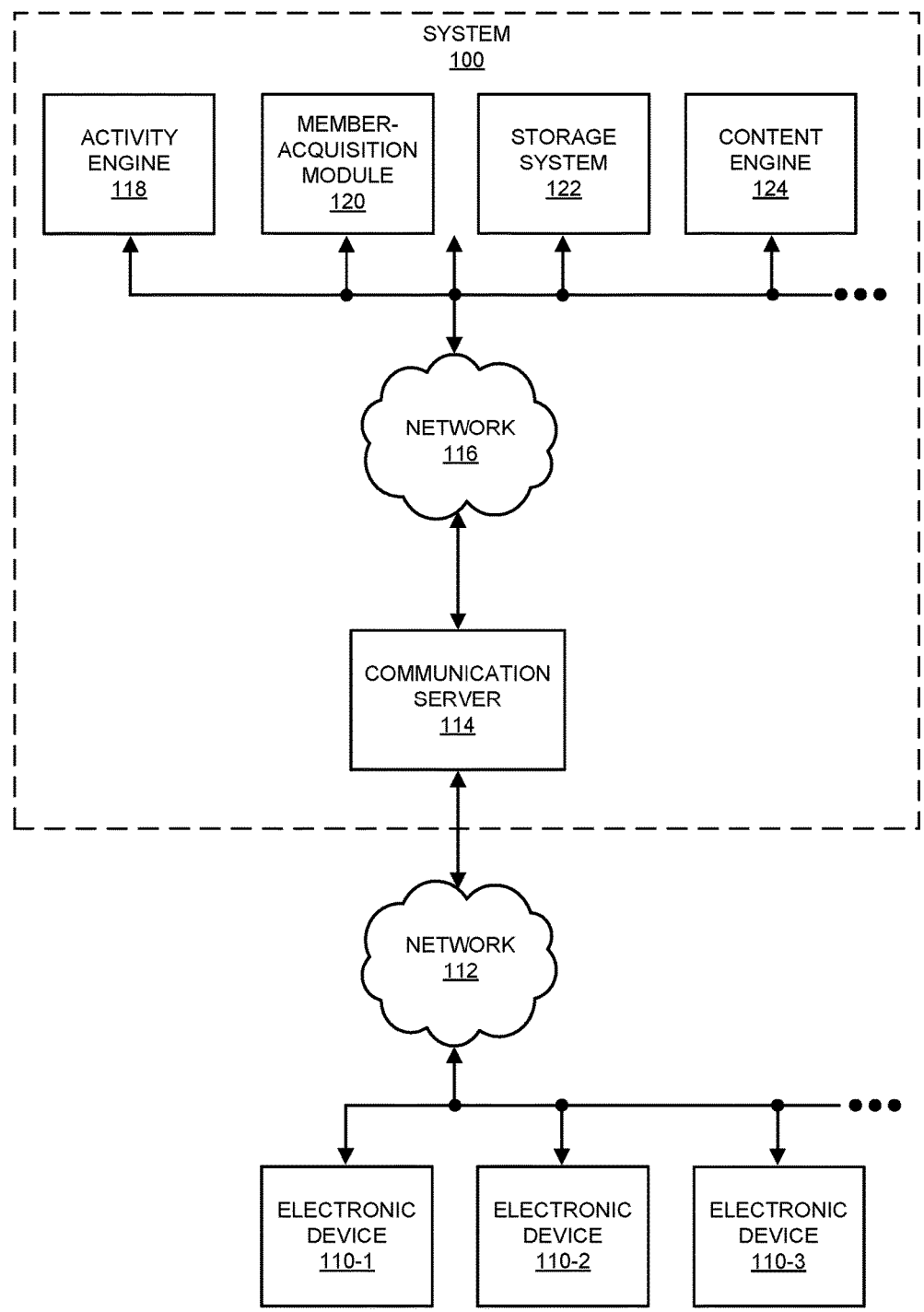
FIG. 1 is a block diagram illustrating a system used to provide invitations in accordance with an embodiment of the present disclosure.

We now describe embodiments of the system and its use. FIG. 1 presents a block diagram illustrating a system 100 that performs the communication technique. In this system, users of electronic devices 110 may use a software product, such as instances of a software application that is resident on and that executes on electronic devices 110. In some implementations, the users may interact with a web page that is provided by communication server 114 via network 112, and which is rendered by web browsers on electronic devices 110. For example, at least a portion of the software application executing on electronic devices 110 may be an application tool that is embedded in the web page, and that executes in a virtual environment of the web browsers. Thus, the application tool may be provided to the users via a client-server architecture.

The software application operated by the users may be a standalone application or a portion of another application that is resident on and that executes on electronic devices 110 (such as a software application that is provided by communication server 114 or that is installed on and that executes on electronic devices 110).

Using one of electronic devices 110 (such as electronic device 110-1) as an illustrative example, a user of electronic device 110-1 may use the software application to interact with other users in a social network (and, more generally, a network or community of users), such as a professional social network, which facilitates interactions among the users. The interactions among the users may specify a social graph in which nodes correspond to the users and edges between the nodes correspond to the users' interactions, interrelationships, and/or connections.

Note that each of the users of the software application may have an associated user profile that includes personal and professional characteristics and experiences, which are sometimes collectively referred to as 'attributes' or 'characteristics.' For example, a user profile may include: demographic information (such as age and gender), geographic location, work industry for a current employer, a functional area (e.g., engineering, sales, consulting), seniority in an organization, employer size, education (such as schools attended and degrees earned), employment history (such as previous employers and the current employer), professional development, interest segments, groups that the user is affiliated with or that the user tracks or follows, a job title, additional professional attributes (such as skills), and/or inferred attributes (which may include or be based on user behaviors). Moreover, user behaviors may include: log-in frequencies, search frequencies, search topics, browsing certain web pages, locations (such as IP addresses) associated with the users, advertising or recommendations presented to the users, user responses to the advertising or recommendations, likes or shares exchanged by the users, interest segments for the likes or shares, and/or a history of user activities when using the social network. Furthermore, the interactions among the users may help define a social graph in which nodes correspond to the users and edges between the nodes correspond to the users' interactions, interrelationships, and/or connections.

In particular, when using the software application, the users may view content that was posted by other users of the social network and that may include images and/or videos. In general, however, the content may include a wide variety of content and content types, including: documents (such as word-processor documents or files), presentations, spreadsheets, web pages, websites, albums with multiple pictures, etc. In general, the content may include: audio, video, text, graphics, multimedia content, verbal, written, and/or recorded information (such as comments or commentary). Note that content may be presented to the users by content engine 124 via the software application that executes in the environment of electronic devices 110.

Over time, via network 116, an activity engine 118 in system 100 may aggregate viewing behavior of the users when they view the content. This aggregated information may be stored in a data structure, which is stored in a computer-readable memory, such as storage system 122 that may encompass multiple devices, i.e., a large-scale storage system. For example, the viewing behavior for a particular video may include an average number of images in a document that are viewed by the users and/or a number of views of a video by the users.

As noted previously, one challenge associated with operating a social network is encouraging user engagement, e.g., by attracting new members, such as friends, family members and/or colleagues of the existing users. In particular, manual approaches for identifying prospective new members, and generating and sending invitations to these prospects, can be time-consuming and frustrating for the existing users. In principle, automated retrieval of contact information (e.g., from the electronic mail of a consenting user) and automated generation of invitations can be used to streamline this process. However, in practice this approach is often confounded by the increasing popularity of portable electronic devices (such as cellular telephones). Notably, it can be difficult to access contact information from different electronic devices at disparate locations.

Figure 2:
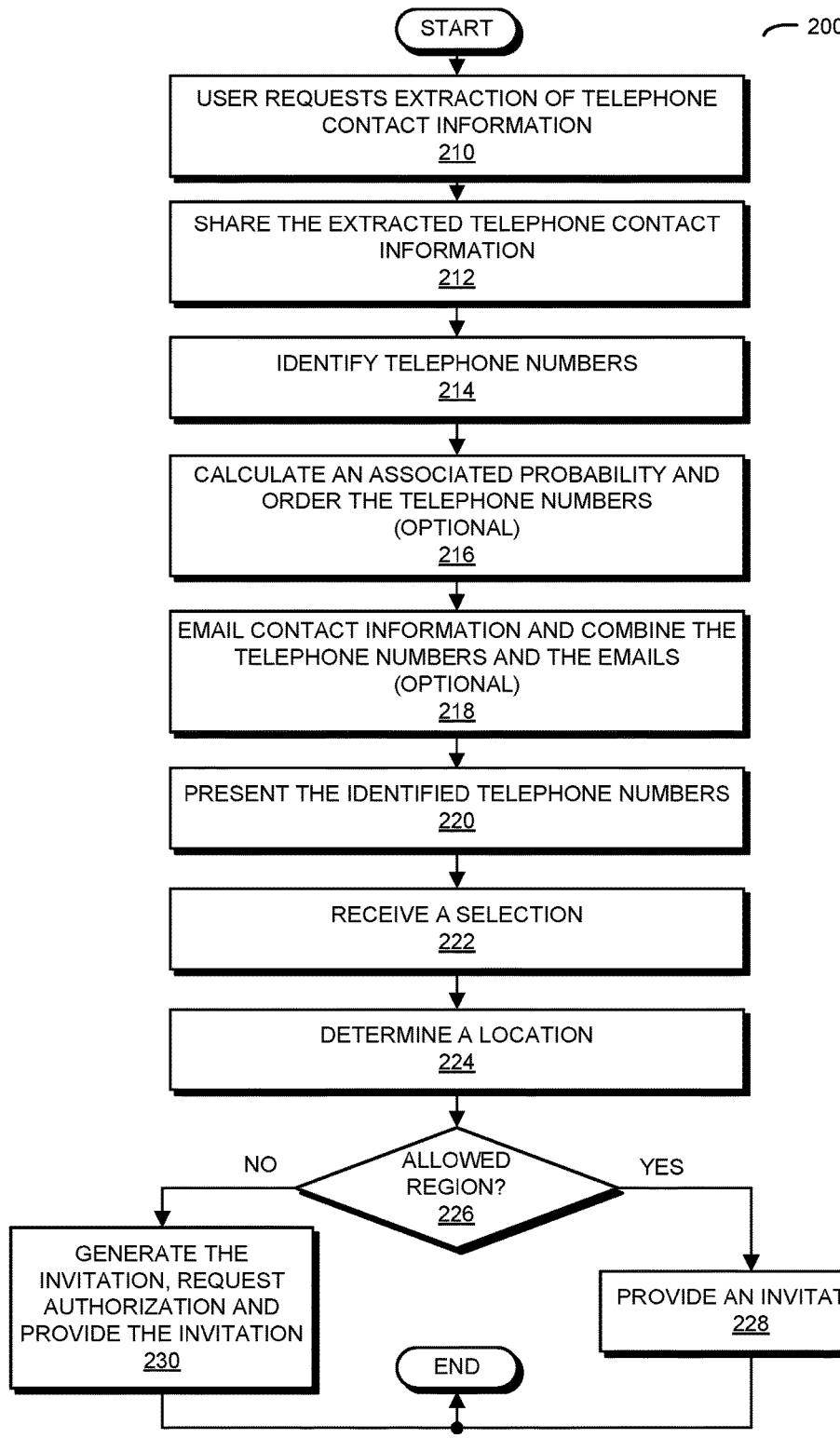
FIG. 2 is a flow chart illustrating a method for providing invitations in accordance with an embodiment of the present disclosure.
Figure 3:
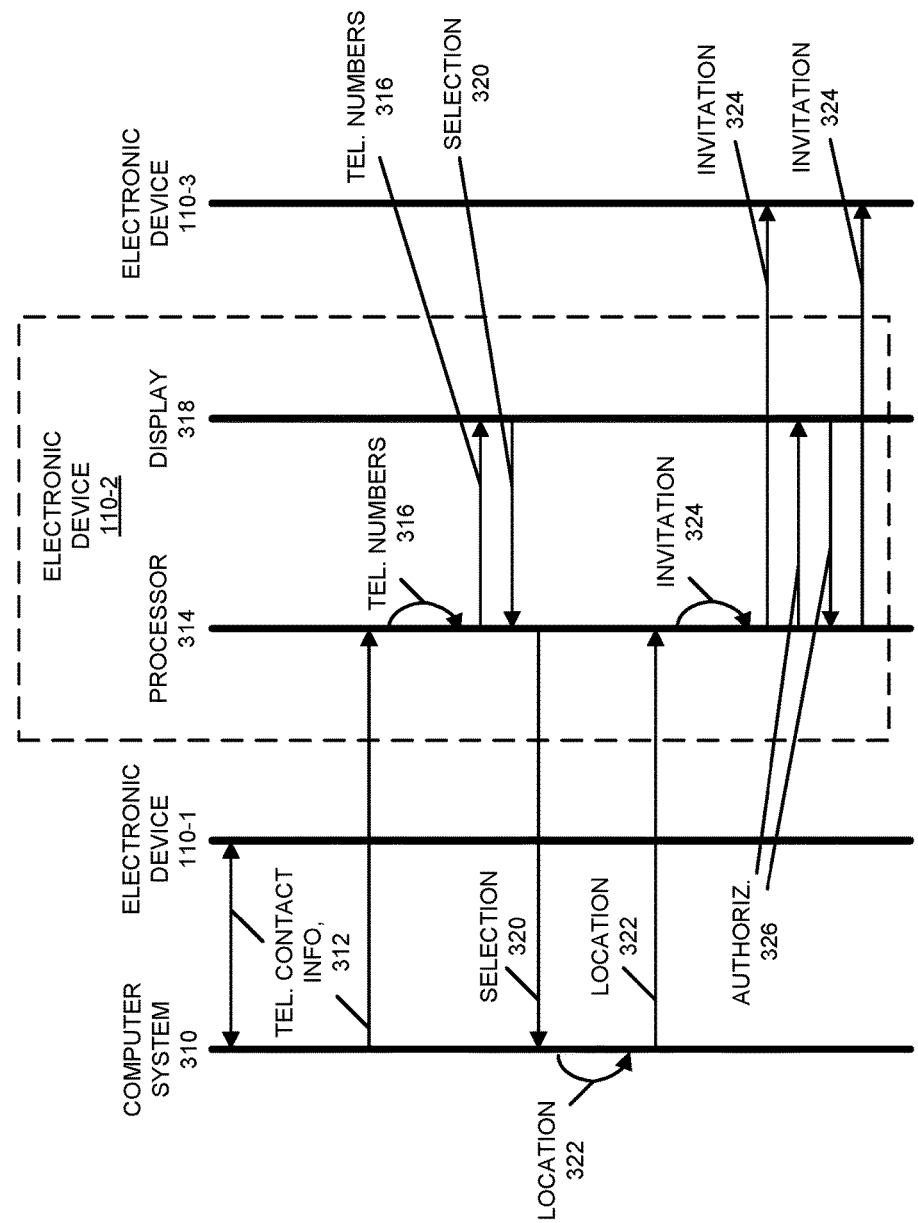
FIG. 3 illustrates communication between the electronic devices of FIG. 1 in accordance with an embodiment of the present disclosure.

This problem can be addressed using the communication technique described further below with reference to FIGS. 2 and 3. In particular, member-acquisition module 120 may extract telephone contact information from a phonebook associated with a telephone application on a portable electronic device of a requesting user (such as electronic device 110-1). This operation may be facilitated by an instance of the software application on electronic device 110-1.

Then, via network 112, communication server 114 and network 116, member-acquisition module 120 may share the telephone contact information across different platforms, such as to another instance of the software application on a desktop computer of the user (such as electronic device 110-2).

Moreover, member-acquisition module 120 may analyze the telephone contact information to identify telephone numbers that are associated with portable electronic devices other than electronic device 110-1, and with individuals other than existing members of the social network. Next, member-acquisition module 120 may present the identified telephone numbers to the user on electronic device 110-2. For example, the identified telephone numbers and/or information specifying the associated individuals may be displayed on a display component on electronic device 110-2 along with a request that the user select one or more of the individuals that the user would like to invite to join the social network.

Subsequently, when member-acquisition module 120 receives a selection, from the user, of a telephone number in the identified telephone numbers associated with an individual, member-acquisition module 120 may determine a location of a portable electronic device associated with the telephone number (such as electronic device 110-3). For example, the location may be dynamically determined (e.g., periodically) as the portable electronic device is moved around, using a global positioning system, a cellular-telephone network, a wireless local area network, a local positioning system, etc. Alternatively or additionally, the location may be determined based on the dialing country code in the telephone number.

Furthermore, based on the telephone number and the determined location, member-acquisition module 120 may conditionally provide, to electronic device 110-3, an invitation to join the social network via SMS. For example, member-acquisition module 120 may automatically generate and provide the invitation to the telephone number if the location is in a region (such as a country) where automated SMS invitations are allowed by government regulation (such as a region outside of the United States).

Alternatively, if the location is in a region where automated SMS invitations are not allowed, member-acquisition module 120 may automatically generate the invitation by populating one or more fields of the invitation, and then may request user authorization to communicate the invitation to electronic device 110-3 using an SMS message. In general, the invitation may be communicated to electronic device 110-3 from electronic device 110-2 and/or system 100. Note that in some implementations, member-acquisition module 120 may automatically generate and provide the invitation to the telephone number if the telephone number is a mobile telephone number (i.e., landlines may be excluded), is not associated with an existing member of the social network, and/or an invitation message has not been sent to the telephone number for at least one month.

In order to improve the likelihood of identifying prospective new members who are of interest to the user and/or who are likely to accept invitations, the communication technique may include one or more additional operations. In particular, for each of the telephone numbers, member-acquisition module 120 may calculate an associated probability of accepting an invitation, where the probability is based on a history of acceptance of previous invitations to join the social network by other individuals, locations where the previous invitations were provided and characteristics of the other individuals that accepted the previous invitations. More generally, information in profiles created by or for other individuals (i.e., previous prospective new members) who accepted invitations and joined the social network, and who are or may be similar to a given prospective new member to whom the user may send an invitation, may be used to determine the likelihood or probability that the given prospective new member will accept an invitation.

Then, prior to presenting the identified telephone numbers to the user on electronic device 110-2, member-acquisition module 120 may order the telephone numbers based on the associated probabilities, so that the most-promising candidates (i.e., those that are most likely to accept invitations) are presented at the top of a list of candidates. More generally, member-acquisition module 120 may order the telephone numbers and the emails based on member behavior of the other individuals in the social network (such as viewing behavior, content uploads, log-in frequency, etc.), which may be predictive for how active in or engaged with the social network the prospective candidates may be.

Note that the other individuals that are examined to determine whether a given prospective new member will likely accept an invitation to join the social network from the user may be identified using a variety of techniques. In particular, identifying the other individuals may involve determining match scores based on association between characteristics of the given prospective new member (or the user who on whose behalf an invitation may be provided) and the profiles of the other individuals that previously accepted invitations and who are now users or members of the social network, and selecting the other individuals based on the match scores.

For example, a match score for one of the other individuals may be a weighted summation of matches between characteristics of the given prospective new member (or features of the user's profile in the social network) and features in the other individual's profile (with different features, such as education or work experience, having different weights), and the other individuals may be those whose match scores exceed a threshold value. Alternatively or additionally, the other individuals may be identified using a predetermined supervised-learning model that relates the characteristics and the profiles. In some embodiments, the supervised-learning model includes one of: a neural network, a classification and regression tree, a support vector machine, a regression model, etc. More generally, the other individuals may be identified based on a statistical association (which is sometimes referred to as an 'association') between the characteristics and the information in the profiles.

While the preceding discussion illustrated the sharing of telephone contact information from electronic device 110-1 to electronic device 110-2, in other embodiments the information also (or instead) flows in the opposite direction. In particular, member-acquisition module 120 may enable a user to choose to extract email contact information from an address book associated with an email application on the desktop computer of the user (i.e., electronic device 110-2), where the email contact information includes emails and/or telephone numbers. Then, member-acquisition module 120 may combine the identified telephone numbers and the emails into a list of potential new members of or candidates for the social network. This may allow the quality and/or the accuracy of the potential candidates to be refined.

In these ways, the communication technique may allow the existing users of the social network to be retained and new users of the social network to be acquired. Therefore, this communication technique may increase user engagement with the social network.

Note that information in system 100 may be stored at one or more locations (i.e., locally and/or remotely). Moreover, because this data may be sensitive in nature, it may be encrypted. For example, stored data and/or data communicated via networks 112 and/or 116 may be encrypted.

We now describe embodiments of the communication technique. FIG. 2 presents a flow chart illustrating a method 200 for providing an invitation, which may be performed by a computer system (such as system 100 in FIG. 1 or computer system 400 in FIG. 4). During operation, and upon a request from or consent by a first user, the computer system extracts telephone contact information (operation 210) from a phonebook associated with a telephone application on a first portable electronic device of the first user. Then, the computer system shares the extracted telephone contact information (operation 212) across different platforms, where the different platforms include the first portable electronic device and a first desktop computer.

Moreover, the computer system identifies telephone numbers (operation 214) in the telephone contact information that are associated with portable electronic devices other than the first portable electronic device, and with people not known to be members of a social network.

Next, the computer system presents the identified telephone numbers (operation 220) to the first user on the first desktop computer.

After receiving a selection or request, by the first user, of a telephone number to be contacted in the identified telephone numbers (operation 222), the computer system determines a location (operation 224) of a portable electronic device associated with the telephone number. Note that the location may be dynamically determined as a function of time, such as periodically) or as needed (such as when the telephone number has been identified as being associated with a prospective candidate to join the social network).

When the location is in a region that allows automated SMS messages (operation 226), the computer system provides to the portable electronic device, via SMS, the invitation (operation 228) to join the social network, based on the telephone number and the determined location. For example, the invitation may be automatically generated and provided via SMS when the determined location is outside of the United States. Note that the invitation may be provided via SMS by the desktop computer and/or by a server associated with the computer system (e.g., a cloud-based server).

Alternatively, when the location is not in a region that allows automated SMS messages (operation 226), the computer system may (operation 230): generate the invitation by populating one or more fields of the invitation; request authorization from the first user to provide the invitation; and, when the authorization is received, provide the invitation. For example, the invitation may be automatically generated, authorization may be requested and, when received, the invitation may be provided via SMS when the determined location is inside of the United States.

In some embodiments, for each of the telephone numbers, the computer system optionally calculates an associated probability of accepting an invitation (operation 216), where the probability is based on a history of acceptance of previous invitations to join the social network, locations where the previous invitations were provided and characteristics of individuals that accepted the previous invitations. Moreover, the probability may also be based on whether an individual has accepted a previous invitation, whether the individual is already a member of the social network (and thus is not eligible for receiving an invitation message), whether the individual does (or does not) wish to receive an invitation (e.g., the individual may have unsubscribed or requested not to receive invitations), etc. Prior to presenting the identified telephone numbers, the computer system optionally may order the telephone numbers based on the associated probabilities. As noted previously, more generally, the computer system may order the telephone numbers and the emails based on member behavior in the social network.

Alternatively or additionally (e.g., upon request by the first user), the computer system may optionally obtain email contact information (operation 218) from an address book associated with an email application on the first desktop computer of the first user, where the email contact information includes emails and/or telephone numbers. Further, the computer system may optionally combine the telephone numbers and the emails into a list of potential new members of the social network.

In an exemplary embodiment, method 200 is implemented using one or more electronic devices and at least one server (and, more generally, a computer system), which communicate through a network, such as a cellular-telephone network and/or the Internet (e.g., using a client-server architecture). This is illustrated in FIG. 3.

During this method, computer system 310 (which may implement some or all of the functionality of system 100 in FIG. 1) may extract telephone contact information 312 from a phonebook associated with a telephone application on a portable electronic device of a user (such as electronic device 110-1), with the user's approval.

Then, computer system 310 may share extracted telephone contact information 312 across different platforms, such as with a desktop computer of the user (e.g., electronic device 110-2), in addition to electronic device 110-1. In some implementations, the telephone contact information 312 need not be automatically returned from computer system 310 to electronic device 110-1, because the device already possesses the information. However, the telephone contact information may indeed be transmitted from computer system 310 to electronic device 110-1 if it is being provided in a form better suited to a communication technique described herein, or if there is some other reason to do so (e.g., the information on device 110-1 is stale).

Moreover, a processor 314 in electronic device 110-2 may identify telephone numbers 316 in extracted telephone contact information 312 that are associated with portable electronic devices other than electronic device 110-1, and with individuals other than members of a social network.

Next, electronic device 110-2 may present identified telephone numbers 316 to the user on a display 318 on electronic device 110-2. In response, the user may select 320 one of identified telephone numbers 316 using a user interface displayed on display 318. For example, the user may click on or activate a virtual icon in a user interface on a touch-sensitive display.

After receiving selection 320 from electronic device 110-2, computer system 310 may determine a location 322 of a portable electronic device associated with the telephone number (such as electronic device 110-3). Then, computer system 310 may provide location 322 to electronic device 110-2.

When location 322 is in a region that allows automated SMS messages, electronic device 110-2 may automatically generate invitation 324 and may provide, to electronic device 110-3, invitation 324 via SMS to join the social network based on the telephone number and determined location 322. While invitation 324 is illustrated as being provided by electronic device 110-2 to electronic device 110-3, in other embodiments invitation 324 is provided directly from computer system 310 to electronic device 110-3 (such as via a cloud-based server).

Alternatively, when location 322 is not in a region that allows automated SMS messages, electronic device 110-2 may generate invitation 324 by populating one or more fields of invitation 324; request authorization 326 from the user to provide invitation 324 (e.g., by displaying an authorization question on display 318); and, when authorization 326 is received, provide invitation 324 to electronic device 110-3 via SMS.

In some embodiments of method 200, there may be additional or fewer operations. For example, the user may provide authorization and/or account credentials that enable extraction of the telephone contact information from the phonebook and/or the contact information from the email application. Moreover, the order of the operations may be changed, and/or two or more operations may be combined into a single operation.

In an exemplary embodiment, the communication technique is used to improve the quality of engagement of users with a social network by automatically identifying and conditionally inviting potential new users or members of the social network. In particular, without the communication technique, users may only be able to send invitations via SMS from their portable electronic devices. However, this may require that the users download an application that executes on their portable electronic devices.

Alternatively, without the communication technique, users could send invitations via email from their desktop computers. However, as portable electronic devices (such as cellular telephones) have become more popular, email applications on desktop computers may not include as many of the users' contacts.

By using the communication technique, users may have multiple channels that they can use to automatically identify potential candidates for their subnetworks of connections in the social network and to conditionally invite the potential candidates to join the social network. Thus, by sharing contact information across different platforms, the communication technique may allow prospective candidates to be robustly identified and acquired in regions where a portable electronic device is preferred over a desktop computer, and vice versa. Consequently, by blurring the distinctions between different platforms, the communication technique may allow users to perform address-book import and to build their subnetworks of connections in the social network regardless of the platform being used.

Figure 4:
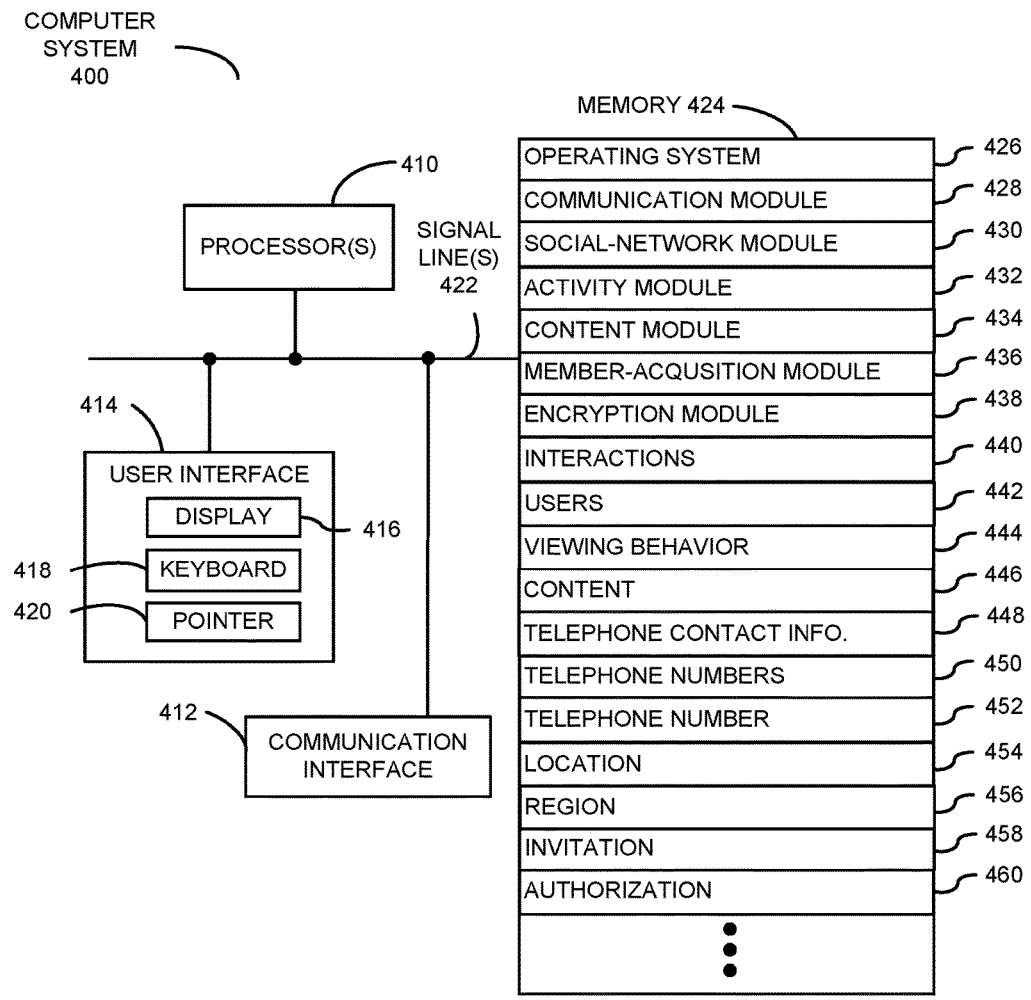
FIG. 4 is a block diagram illustrating a computer system that performs the methods of FIGS. 2 and 3 in accordance with an embodiment of the present disclosure.

We now describe embodiments of a computer system for performing the communication technique and its use. FIG. 4 presents a block diagram illustrating a computer system 400 that performs method 200 (FIGS. 2 and 3), such as system 100 in FIG. 1 or computer system 310 in FIG. 3. Computer system 400 includes one or more processing units or processors 410 (which are sometimes referred to as 'processing modules'), a communication interface 412, a user interface 414, memory 424, and one or more signal lines 422 coupling these components together. Note that the one or more processors 410 may support parallel processing and/or multi-threaded operation, the communication interface 412 may have a persistent communication connection, and the one or more signal lines 422 may constitute a communication bus. Moreover, the user interface 414 may include: a display 416 (such as a touchscreen), a keyboard 418, and/or a pointer 420 (such as a mouse).

Memory 424 in computer system 400 may include volatile memory and/or non-volatile memory. More specifically, memory 424 may include: ROM, RAM, EPROM, EEPROM, flash memory, one or more smart cards, one or more magnetic disc storage devices, and/or one or more optical storage devices. Memory 424 may store an operating system 426 that includes procedures (or a set of instructions) for handling various basic system services for performing hardware-dependent tasks. Memory 424 may also store procedures (or a set of instructions) in a communication module 428. These communication procedures may be used for communicating with one or more computers and/or servers, including computers and/or servers that are remotely located with respect to computer system 400.

Memory 424 may also include multiple program modules, including: social-network module 430, activity module 432, content module 434, member-acquisition module 436, and/or encryption module 438. Note that one or more of these program modules (or sets of instructions) may constitute a computer-program mechanism, i.e., software.

During operation of computer system 400, social-network module 430 facilitates interactions 440 among users 442 via communication module 428 and communication interface 412. These interactions may be gathered by activity module 432, and may include viewing behavior 444 of users 442 when viewing content 446, provided by content module 434, in a social network that is implemented using social-network module 430.

In order to help users expand their connections in the social network, member-acquisition module 436 (such as an identification module) may (with permission) extract telephone contact information 448 from a phonebook associated with a telephone application on a portable electronic device of a user via communication interface 412 and communication module 428. Then, member-acquisition module 436 may share extracted telephone contact information 448 across different platforms, such as with a desktop computer of the user via communication module 428 and communication interface 412.

Moreover, member-acquisition module 436 may identify telephone numbers 450 in telephone contact information 448 that are associated with portable electronic devices other than the portable electronic device, and with individuals other than members of a social network.

Next, member-acquisition module 436 may present identified telephone numbers 450 to the user on the desktop computer via communication module 428 and communication interface 412. In response, the user may select a telephone number 452 in identified telephone numbers 450, which is received via communication interface 412 and communication module 428.

After receiving telephone number 452, member-acquisition module 436 (such as a location module) may determine a location 454 of a portable electronic device associated with telephone number 452.

When location 454 is in a region 456 that allows automated SMS messages, member-acquisition module 436 (such as an invitation module) may provide, to the portable electronic device associated with telephone number 452, and via communication module 428 and communication interface 412, an invitation 458 via SMS to join the social network based on telephone number 452 and determined location 454.

Alternatively, when location 454 is not in region 456 that allows automated SMS messages, member-acquisition module 436 may generate invitation 458 by populating one or more fields of invitation 458, and may request authorization 460, via communication module 428 and communication interface 412, from the user to provide invitation 458. When authorization 460 is received via communication interface 412 and communication module 428, member-acquisition module 436 may provide, to the portable electronic device associated with telephone number 452, invitation 458 using SMS via communication module 428 and communication interface 412.

Because information in computer system 400 may be sensitive in nature, in some embodiments at least some of the data stored in memory 424 and/or at least some of the data communicated using communication module 428 is encrypted using encryption module 438.

Instructions in the various modules in memory 424 may be implemented in a high-level procedural language, an object-oriented programming language, and/or in an assembly or machine language. Note that the programming language may be compiled or interpreted, e.g., configurable or configured, to be executed by the one or more processors.

Although computer system 400 is illustrated as having a number of discrete items, FIG. 4 is intended to be a functional description of the various features that may be present in computer system 400 rather than a structural schematic of the embodiments described herein. In practice, and as recognized by those of ordinary skill in the art, the functions of computer system 400 may be distributed over a large number of servers or computers, with various groups of the servers or computers performing particular subsets of the functions. In some embodiments, some or all of the functionality of computer system 400 is implemented in one or more application-specific integrated circuits (ASICs) and/or one or more digital signal processors (DSPs).

Computer systems (such as computer system 400), as well as electronic devices, computers and servers in system 100 (FIG. 1), may include one of a variety of devices capable of manipulating computer-readable data or communicating such data between two or more computing systems over a network, including: a personal computer, a laptop computer, a tablet computer, a mainframe computer, a portable electronic device (such as a cellular phone or PDA), a server and/or a client computer (in a client-server architecture). Moreover, network 112 (FIG. 1) may include: the Internet, World Wide Web (WWW), an intranet, a cellular-telephone network, LAN, WAN, MAN, or a combination of networks, or other technology enabling communication between computing systems.

System 100 (FIG. 1) and/or computer system 400 may include fewer components or additional components. Moreover, two or more components may be combined into a single component, and/or a position of one or more components may be changed. In some embodiments, the functionality of system 100 (FIG. 1) and/or computer system 400 may be implemented more in hardware and less in software, or less in hardware and more in software, as is known in the art.

While a social network has been used as an illustration in the preceding embodiments, more generally the communication technique may be used to identify potential users in a wide variety of applications or systems, including news, media, online forums and entertainment applications. Moreover, the communication technique may be used in applications where the communication or interactions among different entities (such as people, organizations, etc.) can be described by a social graph. Note that the people may be loosely affiliated with a website (such as viewers or users of the website), and thus may include people who are not formally associated (as opposed to the users of a social network who have user accounts). Thus, the connections in the social graph may be defined less stringently than by explicit acceptance of requests by individuals to associate or establish connections with each other, such as people who have previously communicated with each other (or not) using a communication protocol, or people who have previously viewed each other's home pages (or not), etc. In this way, the communication technique may be used to expand the quality of interactions and value-added services among relevant or potentially interested people in a more loosely defined group of people.

In the preceding description, we refer to 'some embodiments.' Note that 'some embodiments' describes a subset of all of the possible embodiments, but does not always specify the same subset of embodiments.

By configuring privacy controls or settings as they desire, members of a social network, a professional network, or other user community that may use or interact with embodiments described herein can control or restrict the information that is collected from them, the information that is provided to them, their interactions with such information and with other members, and/or how such information is used. Implementation of these embodiments is not intended to supersede or interfere with the members' privacy settings.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer-system-implemented method for providing an invitation, the method comprising:
   extracting telephone contact information from a phonebook associated with a telephone application on a first portable electronic device of a first user;
   using the computer system, sharing the extracted telephone contact information across different platforms, wherein the different platforms include the first portable electronic device and a first desktop computer;
   identifying telephone numbers in the extracted telephone contact information that are associated with portable electronic devices other than the first portable electronic device, and with individuals other than members of a social network;
   for each of the identified telephone numbers, calculating an associated probability of accepting an invitation, wherein the probability is based on:
      a history of acceptance of previous invitations to join the social network,
      locations where the previous invitations were provided, and
      characteristics of individuals that accepted the previous invitations;
   ordering the telephone numbers based on the associated probabilities;
   presenting the identified telephone numbers to the first user on the first desktop computer;
   receiving a selection, by the first user, of a telephone number in the identified telephone numbers;
   determining a location of a portable electronic device associated with the telephone number; and
   conditionally providing to the portable electronic device, via a Short Message Service (SMS) message, the invitation to join the social network, based on the telephone number and the determined location.

2. The method of claim 1, wherein the invitation is automatically provided when the determined location is outside of the United States.

3. The method of claim 1, wherein, when the location is within the United States, the method further comprises:
   generating the invitation by populating one or more fields of the invitation;
   requesting authorization from the first user to provide the invitation; and
   when the authorization is received, providing the invitation.

4. The method of claim 1, wherein the location is dynamically determined as a function of time.

5. The method of claim 1, wherein the method further comprises:
   extracting email contact information from an address book associated with an email application on the first desktop computer of the first user, wherein the email contact information includes emails; and
   combining the telephone numbers and the emails into a list of potential new members of the social network.

6. The method of claim 1, wherein the method further comprises ordering the telephone numbers and the emails based on member behavior in the social network.

7. The method of claim 1, wherein the telephone contact information is extracted from email contact lists associated with an email application on the first portable electronic device.

8. The method of claim 7, wherein the method further comprises:
   extracting email addresses from one of: the phonebook, and the email application; and
   sharing the extracted email addresses across the different platforms.

9. An apparatus, comprising:
   one or more processors;
   memory; and
   a program module, wherein the program module is stored in the memory and, during operation of the apparatus, is executed by the one or more processors to provide an invitation, the program module including:
      instructions for extracting telephone contact information from a phonebook associated with a telephone application on a first portable electronic device of a first user;
      instructions for sharing the extracted telephone contact information across different platforms, wherein the different platforms include the first portable electronic device and a first desktop computer;
      instructions for identifying telephone numbers in the extracted telephone contact information that are associated with portable electronic devices other than the first portable electronic device, and with individuals other than members of a social network;
      instructions for calculating, for each of the identified telephone numbers, an associated probability of accepting an invitation, wherein the probability is based on:

a history of acceptance of previous invitations to join the social network,
locations where the previous invitations were provided, and
characteristics of individuals that accepted the previous invitations;
instructions for ordering the telephone numbers based on the associated probabilities;
instructions for presenting the identified telephone numbers to the first user on the first desktop computer;
instructions for receiving a selection, by the first user, of a telephone number in the identified telephone numbers;
instructions for determining a location of a portable electronic device associated with the telephone number; and
instructions for conditionally providing to the portable electronic device, via a Short Message Service (SMS) message, the invitation to join the social network based on the telephone number and the determined location.

10. The apparatus of claim 9, wherein the invitation is automatically provided when the determined location is outside of the United States.

11. The apparatus of claim 9, wherein, when the location is within the United States, the program module further comprises:
instructions for generating the invitation by populating one or more fields of the invitation;
instructions for requesting authorization from the first user to provide the invitation; and
instructions for providing the invitation when the authorization is received.

12. The apparatus of claim 9, wherein the location is dynamically determined as a function of time.

13. The apparatus of claim 9, wherein the program module further comprises:
instructions for extracting email contact information from an address book associated with an email application on the first desktop computer of the first user, wherein the email contact information includes emails; and
instructions for combining the telephone numbers and the emails into a list of potential new members of the social network.

14. The apparatus of claim 9, wherein the program module further comprises instructions for ordering the telephone numbers and the emails based on member behavior in the social network.

15. A system, comprising:
an identification module comprising a non-transitory computer-readable medium storing instructions that, when executed, cause the system to:
extract telephone contact information from a phonebook associated with a telephone application on a first portable electronic device of a first user;
share the extracted telephone contact information across different platforms, wherein the different platforms include the first portable electronic device and a first desktop computer;
identify telephone numbers in the extracted telephone contact information that are associated with portable electronic devices other than the first portable electronic device, and with individuals other than members of a social network;
for each of the identified telephone numbers, calculate an associated probability of accepting an invitation, wherein the probability is based on:
a history of acceptance of previous invitations to join the social network,
locations where the previous invitations were provided, and
characteristics of individuals that accepted the previous invitations;
order the telephone numbers based on the associated probabilities;
present the identified telephone numbers to the first user on the first desktop computer; and
receive a selection, by the first user, of a telephone number in the identified telephone numbers;
a location module comprising a non-transitory computer-readable medium storing instructions that, when executed, cause the system to determine a location of a portable electronic device associated with the telephone number; and
an invitation module comprising a non-transitory computer-readable medium storing instructions that, when executed, cause the system to conditionally provide to the portable electronic device, via a Short Message Service (SMS) message, the invitation to join the social network based on the telephone number and the determined location.

16. The system of claim 15, wherein the non-transitory computer readable medium of the identification module further stores instructions that, when executed, cause the system to:
extract email contact information from an address book associated with an email application on the first desktop computer of the first user, wherein the email contact information includes emails; and
combine the telephone numbers and the emails into a list of potential new members of the social network.

17. The system of claim 16, wherein the non-transitory computer readable medium of the identification module further stores instructions that, when executed, cause the system to order the telephone numbers and the emails based on member behavior in the social network.

18. The system of claim 15, wherein the invitation is automatically provided when the determined location is outside of the United States.

19. The system of claim 15, wherein, the non-transitory computer-readable medium of the invitation module further stores instructions that, when executed and when the determined location is within the United States, cause the system to:
generate the invitation by populating one or more fields of the invitation;
request authorization from the first user to provide the invitation; and
provide the invitation when the authorization is received.

20. The system of claim 15, wherein the location is dynamically determined as a function of time.

* * * * *